US009371959B2

(12) United States Patent
Kuchler

(10) Patent No.: US 9,371,959 B2
(45) Date of Patent: Jun. 21, 2016

(54) STORAGE AND CHARGING STATION FOR ELECTRONIC APPLIANCES

(71) Applicant: Marcus Kuchler, Munich (DE)

(72) Inventor: Marcus Kuchler, Munich (DE)

( * ) Notice: Subject to any disclaimer, the term of this patent is extended or adjusted under 35 U.S.C. 154(b) by 0 days.

(21) Appl. No.: 14/356,758

(22) PCT Filed: Nov. 9, 2012

(86) PCT No.: PCT/EP2012/072337
§ 371 (c)(1),
(2) Date: May 7, 2014

(87) PCT Pub. No.: WO2013/068573
PCT Pub. Date: May 16, 2013

(65) Prior Publication Data
US 2014/0312202 A1   Oct. 23, 2014

(30) Foreign Application Priority Data

Nov. 11, 2011   (DE) ..................... 20 2011 107 782 U

(51) Int. Cl.
*F16M 11/10*    (2006.01)
*F16M 13/00*    (2006.01)
(Continued)

(52) U.S. Cl.
CPC ............ *F16M 13/00* (2013.01); *B60R 11/0252* (2013.01); *F16M 11/10* (2013.01); *G06F 1/1632* (2013.01); *F16M 2200/08* (2013.01)

(58) Field of Classification Search
CPC ... F16M 11/10; F16M 13/00; F16M 2200/08; B60R 11/0241; B60R 11/0252; G06F 1/1632

USPC ............ 248/346.06; 361/807, 808, 809, 810, 361/679.01, 679.44, 679.56, 679.55
See application file for complete search history.

(56) References Cited

U.S. PATENT DOCUMENTS 5,978,569 A      11/1999   Traeger
6,439,906 B1 *    8/2002   Gray ...................... H01R 24/46
                                                    439/188

(Continued)

FOREIGN PATENT DOCUMENTS

EP         2060962       5/2009
JP         2001-312227 A  11/2001

OTHER PUBLICATIONS

"Die Maxima Family Ladestation," Mobile Fun, retrieved from the Internet: http://http://web.archive.org/web/20110623041858/http://www.mobilefun.de/29311-die-maxima-family-ladestation.htm, (Jun. 23, 2011).

(Continued)

*Primary Examiner* — Michael Safavi
(74) *Attorney, Agent, or Firm* — Barnes & Thornburg LLP

(57) ABSTRACT

A support for an electronic appliance comprises a hollow profile 1 for disposing one or more electronic appliances 10 thereon. Within a first channel 4 which has a cylindrical basic shape, a similarly cylindrical connection plug may be positioned for connection to the electronic appliances 10, so that the connection plug is freely slidable in the longitudinal direction and at the same time pivotable within a predetermined angular range transversal to the support about the cylinder axis of the first channel 4. Thereby, one or more electronic appliances 10 may be stored on the support and may be conveniently and securely connected to the connection plug for charging their accumulators or for synchronizing the data stored thereon.

11 Claims, 3 Drawing Sheets

(51) Int. Cl.
   *B60R 11/02* (2006.01)
   *G06F 1/16* (2006.01)

(56) References Cited

U.S. PATENT DOCUMENTS

| | | | | |
|---|---|---|---|---|
| 6,477,588 | B1* | 11/2002 | Yerazunis | G06F 1/1632 361/679.41 |
| 7,053,774 | B2* | 5/2006 | Sedon et al. | 340/568.2 |
| 8,780,549 | B2* | 7/2014 | Aldana | 361/679.44 |
| 8,995,121 | B2* | 3/2015 | Yen | G06F 1/1632 361/679.2 |
| 2003/0128505 | A1* | 7/2003 | Yin | G06F 1/1632 361/679.41 |
| 2009/0073642 | A1 | 3/2009 | Jubelirer et al. | |
| 2011/0121776 | A1* | 5/2011 | Lev | G06F 1/1632 320/107 |
| 2012/0200989 | A1* | 8/2012 | Byrne et al. | 361/641 |
| 2012/0273643 | A1* | 11/2012 | Chang | 248/346.06 |
| 2013/0058065 | A1* | 3/2013 | Minaguchi et al. | 361/807 |
| 2013/0329360 | A1* | 12/2013 | Aldana | 361/679.56 |
| 2014/0247137 | A1* | 9/2014 | Proud et al. | 340/870.01 |
| 2014/0273590 | A1* | 9/2014 | Sharma | G06F 1/1669 439/350 |

OTHER PUBLICATIONS

Search Report issued in Int'l App. No. PCT/EP2012/072337 (Feb. 20, 2013).

* cited by examiner

STORAGE AND CHARGING STATION FOR ELECTRONIC APPLIANCES

CROSS REFERENCE TO RELATED APPLICATIONS

This application is a U.S. nationalization under 35 U.S.C. §371 of International Application No. PCT/EP2012/072337, filed Nov. 9, 2012, which claims priority to German Patent Application No. 202011107782.2, filed Nov. 11, 2011. The disclosures set forth in the referenced applications are incorporated herein by reference in their entireties.

TECHNICAL FIELD

The present invention relates to a simple mechanical support which serves as a useful and readily adaptable storage and charging station for electronic appliances.

PRIOR ART

The accumulators of battery-operated electronic appliances require periodic recharging. Typically, this is carried out via a charging cable which transforms the generally available line current into the type of direct current which is required for the charging of the accumulators. Moreover, many electronic appliances, in particular mobile terminals such as mobile phones, smartphones or PDAs (Personal Digital Assistants), have an interface for exchanging data with a computer via a cable. In both cases it is necessary to provide and connect a cable to the electronic appliance. In case of a charging cable, the cable is to be connected with the line current and in case of a data transmission cable with the computer.

As battery-operated electronic appliances, in particular smartphones, become increasingly popular, this brings up the problem that such appliances frequently need to be recharged or connected to a computer in order to synchronise the data stored thereon. Also, it often occurs that there is a plurality of such appliances used in one household. This may have the effect that cables for charging or data exchange need to be searched before they can be assigned to the correct appliance or that the cables cannot be found at all for a while.

Many appliances produced by the company Apple, which are world-wide successful due to their simple operability, can be charged or connected for data transmission via a single connection terminal. For iPhone 5 appliances this connection terminal is a 9-pole "lightning" terminal; for iPhone appliances of earlier generations this is a 30-pole "dock" terminal. By this uniform standard terminal a single cable with a corresponding plug may be used for charging and synchronising all corresponding electronic appliances. At the other end of the charging cable the Apple systems usually provide a USB plug.

Similar plug connecting systems are used by manufacturers of other smartphones, e.g. Samsung or Microsoft. The present invention is applicable as a support for electronic appliances of different kinds independently from the manufacturing company.

SUMMARY OF THE INVENTION

An object of the invention is to provide a well-prized, robust and useful storage and charging station for battery-operated electronic appliances, in particular mobile terminals such as smartphones. The storage and charging station should in particular avoid the cumbersome searching of the appropriate storage or data transmission cable and provide a save and variably usable location for keeping the electronic appliance. It is particularly desired to provide a solution according to which a plurality of electronic appliances used in one household can be stored simultaneously.

The object is at least partially solved by the support defined in present claim 1. The support of the present invention comprises a first channel extending along the longitudinal direction of the support. The electronic connection plug of the electronic appliance is slidable in the longitudinal direction and rotatable or pivotable within a particular angular range in a direction transversal to the longitudinal direction. Due to the linear slidability of the plug the appropriate positioning thereof before and after plugging-in the electronic appliance can be readily set. The pivoting of the connection plug facilitates the plug-in operation into the corresponding appliance terminal and the adaptation to the different sizes of the appliances to be connected. Moreover, it allows the optimum alignment of the screen of the appliance to the field of view of the viewer while the appliance is put onto the support of the present invention. The angular range within which the plug is rotatable or pivotable in the first channel lies preferably within 10° to 40°, more preferably between 20° and 30°, more preferably at about 25°.

According to a preferred embodiment, the first channel has a basic shape which is generally cylindrical, and the appliance connection plug has a base element which fits to the first channel and whose outer diameter is adapted to the inner diameter of the first channel so that the connection plug is pivotable about the middle axis of the cylinder extending in the longitudinal direction. Thereby, it is possible to perform in a simple and reliable manner translational slides in the longitudinal direction as well as rotational settings in the pivoting direction perpendicular thereto. The connection plug can thus be positioned optimally depending on the size of the electronic appliance to be connected and the exact position of the plug terminal thereof.

The first channel preferably comprises a first slit on its cylinder side surface through which the electrical connection element of the connection plug protrudes outwards, and a second slit through which the plug cable is guided into a second channel inside the hollow profile. The two slits may extend across the complete length of the hollow profile but can also extend only across a particular portion thereof. What is of importance is only that the slits are long enough to allow a sufficient translational slide of the connection plug in the longitudinal direction and thus an adaptability of the support of the present invention to different sizes of the electronic appliances to be connected thereto.

Apart from the two slits the wall of the first channel preferably comprises two further portions which, in a cross-section of the longitudinal direction, are comprised of a substantially C-shaped portion and a holding portion opposed thereto. The C-shaped portion guides the cylindrical base element of the connection plug along its cylinder side surface. The holding portion stabilises the base element from the opposite side and thus enables in co-operation with the C-shaped portion a reliable guidance of the connection plug in both the longitudinal direction and the pivoting direction perpendicular thereto.

According to a preferred embodiment, the side surface of the preferably hollow cylindrical base element has a generally rectangular protrusion integrally formed therewith and being also hollow inside. This protrusion protrudes into the second channel and defines the angular range within which the base element may be pivoted about its cylinder axis. In the first extreme position the upper side of the protrusion abuts against the holding portion of the first channel. In the opposite extreme position the protrusion abuts with its lower side against the C-shaped portion of the first channel. The angular range can alternatively be confined by the electronic connection element which also abuts at a particular swivel angle against the holding portion or against the other end of the C-shaped portion. Such an embodiment is, however, less preferable because it exerts mechanical stress on the sensible electronic connection element. This is true even for cases in which the connection element is covered by an additional protection layer and abuts only indirectly via this protection layer against the edges of the first slit.

According to a preferred embodiment, the hollow profile additionally comprises as an important element a supporting rib which extends upwards at an inclined angle. During its storage on the support of the present invention the electronic appliance may be reclined in a sloping fashion backwards against this supporting rib. The supporting rib extends in parallel to the first slit in the longitudinal direction and is displaced to a certain extent backwards thereto so that the electronic appliance, when being connected to the connection plug and reclined against the supporting rib, can be positioned onto the two stripe-shaped portions extending in the longitudinal direction in front of and behind the first slit. Thereby, the electronic appliance connected to the connection plug can be stored stably on the support while the sensible region of the electrical connection with the connection plug is not under mechanical stress. Further, the positioning of the electronic appliance in its upright position allows a good view onto its display screen.

According to a particularly practicable set-up the hollow profile is composed of a main structure formed of two sidewalls which meet at an acute angle and which are additionally connected to each other by a reinforcing rib. The acute angle formed between the two sidewalls is about 3° to 25°, preferably about 5° to 15°, more preferably about 10°. The basic structure has, in the cross-section perpendicular to the longitudinal direction, the form of an acute triangle which is, however, interrupted by the first slit at the upper of the two long sidewalls. Displaced behind the first slit the supporting rib mentioned before extends from the upper sidewall upwards at an inclined angle.

Apart from the reinforcing rib, the upper and lower sidewalls are additionally connected with each other by the third short sidewall of the acute-angled triangle and by the C-shaped portion. The short sidewall lies opposite to the acute angle. Thereby, the hollow profile of the present invention does not only have the required stability but also provides, in addition to the first channel and the second channel extending between the C-shaped portion and the reinforcing rib, a third channel between the short sidewall of the triangular basic structure and the C-shaped portion, and a fourth channel formed by the other two sidewalls of the basic structure connected at an acute angle and the reinforcing rib. Plug connectors may be inserted into these third and fourth channels so as to protrude to a certain extent out of the channels for being inserted into corresponding channels of a similarly formed second hollow profile. Thereby, the hollow profile of the present invention can be prolonged in a modular fashion by connecting one or more further hollow profiles so that it can be adapted to the number and size of the electronic appliances to be stored.

It is particularly preferred to manufacture the hollow profile integrally by extrusion or injection moulding. Preferred materials are plastics, aluminium or other light metals. Since the hollow profile is preferably open at its two end faces, the hollow profile can readily be cut to its desired length by sawing or cutting at the end of the manufacturing process. The hollow profile can therefore readily be produced in an appropriate length and then packaged and delivered with an appropriate number of plug connectors. Furthermore, the customer may also shorten the hollow profile himself so as to adapt it to his individual needs.

BRIEF DESCRIPTION OF THE DRAWINGS

A preferred embodiment will now be described in further detail based on the drawings. Therein shows.

DETAILED DESCRIPTION OF AN EMBODIMENT

Figure 1:
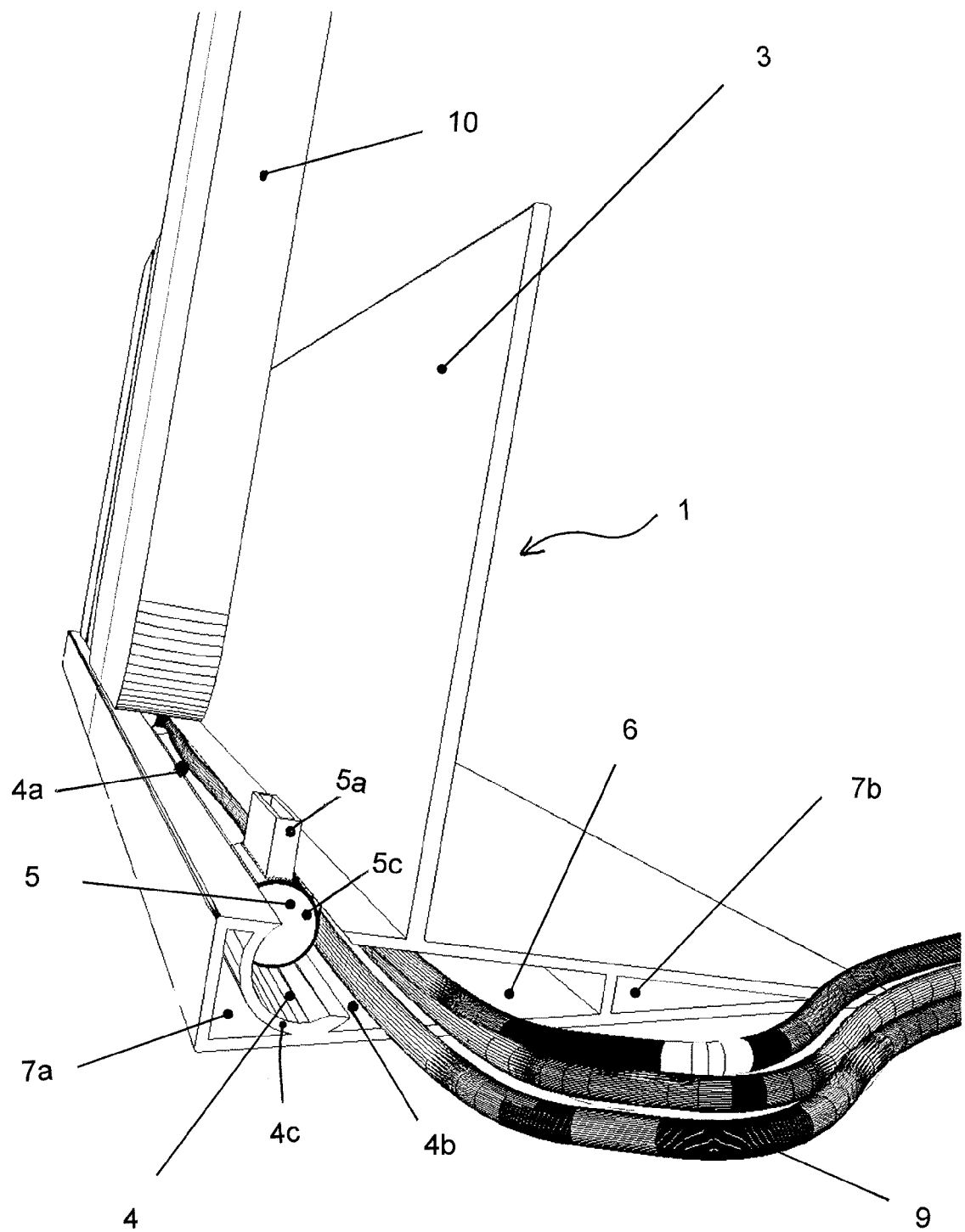
FIG. 1 a perspective view of the support of the present invention in its use.

FIG. 1 shows the support of the present invention in a perspective outline view. Shown is a hollow profile 1 open at its end face. The hollow profile may also be designated as a longitudinal profile. One or more electronic appliances 10 are positioned, with their end faces on which they usually have the connection socket for the charging or data communication cable 9, onto stripe portions extending in the longitudinal direction in front of and behind a first slit 4a extending in the longitudinal direction of the support. The appliances are reclined backwards against a supporting rib 3 extending upwards at an inclined angle. In FIG. 1 a connection plug 5 is plugged into the electronic appliance. From this connection plug 5 the corresponding electronic cable 9 is guided through a second slit 4b and a second channel 6, which serves as a cable channel, outwards for connection to the line current or a computer.

In the foreground of FIG. 1 there is shown a connection plug 5 without an electronic appliance connected thereto. Based on this connection plug 5 the slidability of the connection plug 5 within the hollow profile 1 can be recognised particularly well. The cylindrical first channel 4 provides the likewise cylindrically formed base element 5c of the plug 5 with a linear guidance in the longitudinal direction. Thereby, the base element 5c can be translationally moved along the first channel 4 and into a desired position for connecting an electronic appliance 10. During the sliding movement the electronic connection element 5a protrudes through the longitudinally extending first slit 4a upwards out of the hollow profile 1.

At the same time, the reception of the base element 5c in the cylindrical first channel 4 also allows a pivoting movement of the connection plug 5 in a pivoting direction perpendicular to the longitudinal direction and within a predetermined angular range. This will be explained in further detail based on FIG. 2 below. The function of the third channel 7a and the fourth channel 7b which can be also seen in FIG. 1 will be explained later on based on FIG. 3.

Figure 2:
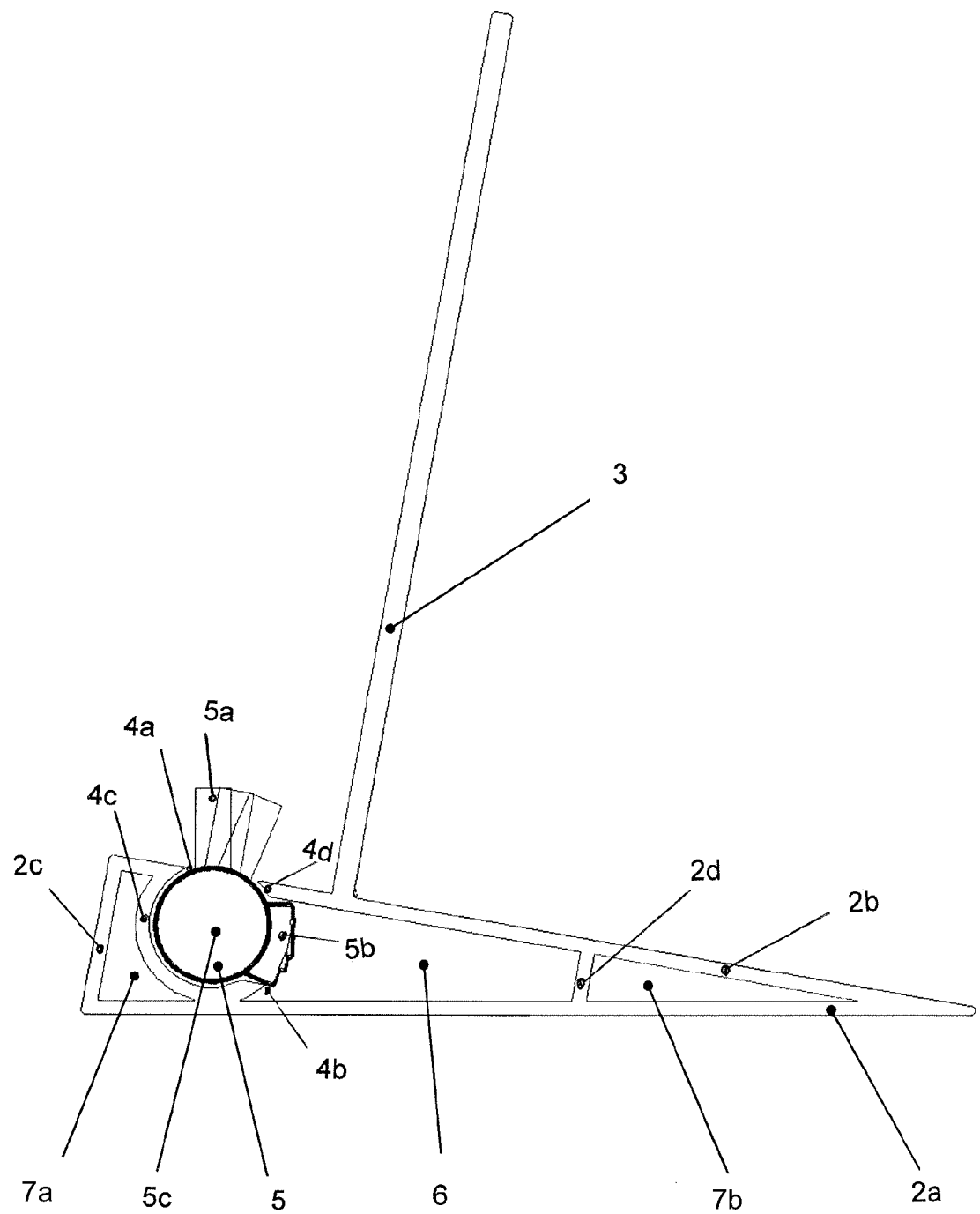
FIG. 2 a cross-sectional view of the support of the present invention with a connection plug in different swivel angle positions.

The cross-sectional view of FIG. 2 shows the hollow profile 1 with a plug 5 in three different swivel positions. The middle swivel position is the position preferred for plugging-in the electronic appliance 10 because the position leaves sufficient room in front of and behind the connection element 5a for inserting the connection element 5a into the connection socket of the electronic appliance 10. The other two swivel positions show the settings of the swivel angle in which a further pivoting movement is blocked. This is because a protrusion 5b extending through the second slit 4b into the second channel 6 will then abut against the holding portion 4d or against the C-shaped profile 4c and thereby generate a mechanical resistance. The protrusion 5b hence serves as a rotation limiting stopper.

FIG. 2 shows clearly the substantially triangular set-up of the base structure of the hollow profile 1 by the three sidewalls 2a, 2b, 2c. The triangular base structure can also be denoted as a stabilising arm. The two long sidewalls 2a, 2b meet at an acute angle of about 10° and are connected by a reinforcing rib 2d. The lower sidewall 2a is in use disposed on the ground and therefore depicted horizontally in FIG. 2. The upper one of the two long sidewalls 2b is in its front region close to the third sidewall 2c interrupted by the first slit 4a through which the electrical connection element 5a of the connection plug 5 extends.

In front of the first slit 4a, the C-shaped profile 4c connects the upper sidewall 2b with the lower sidewall 2a. Thereby, there is formed the third channel 7a between the C-shaped portion 4c and the third sidewall 2c. Behind the first slit 4a the upper sidewall 2b continues backwards with the holding portion 4d slanted in form of a circle segment. Further behind, the supporting rib 3 extends rectangularly from the upper sidewall 2b upwards. The two stripe-shaped portions are separated by the first slit 4a and extend in the front region of the upper sidewall 2a from the front end thereof at the short sidewall 2c to the supporting rib 3. They form the supporting surfaces for the end face of the electronic appliance 10 which is to be connected to the electronic connecting element 5a.

Below the holding portion 4d the wall of the cylindrical first channel 4 is again interrupted, namely by a second slit 4b into which the protrusion 5b protrudes. As already described, the holding portion 4d and the opposite end of the C-shaped portion 4c form an upper and lower stopper defining the maximum swivel angle of the connection plug 5 to the front and back, respectively. The second slit 4b connects the first channel 4 with the second channel 6 and thereby allows to guide the cable connection from the terminal 5a into the second channel 6 from where the cable 9 is guided outwards through an open front face of the second channel 6.

FIG. 2 further shows the fourth channel 7b defined by the reinforcing rib 2d and the upper and lower side surfaces 2b, 2a. The function of this fourth channel 7b as well as that of the third channel 7a shall now be described in further detail based on FIG. 3.

Figure 3:
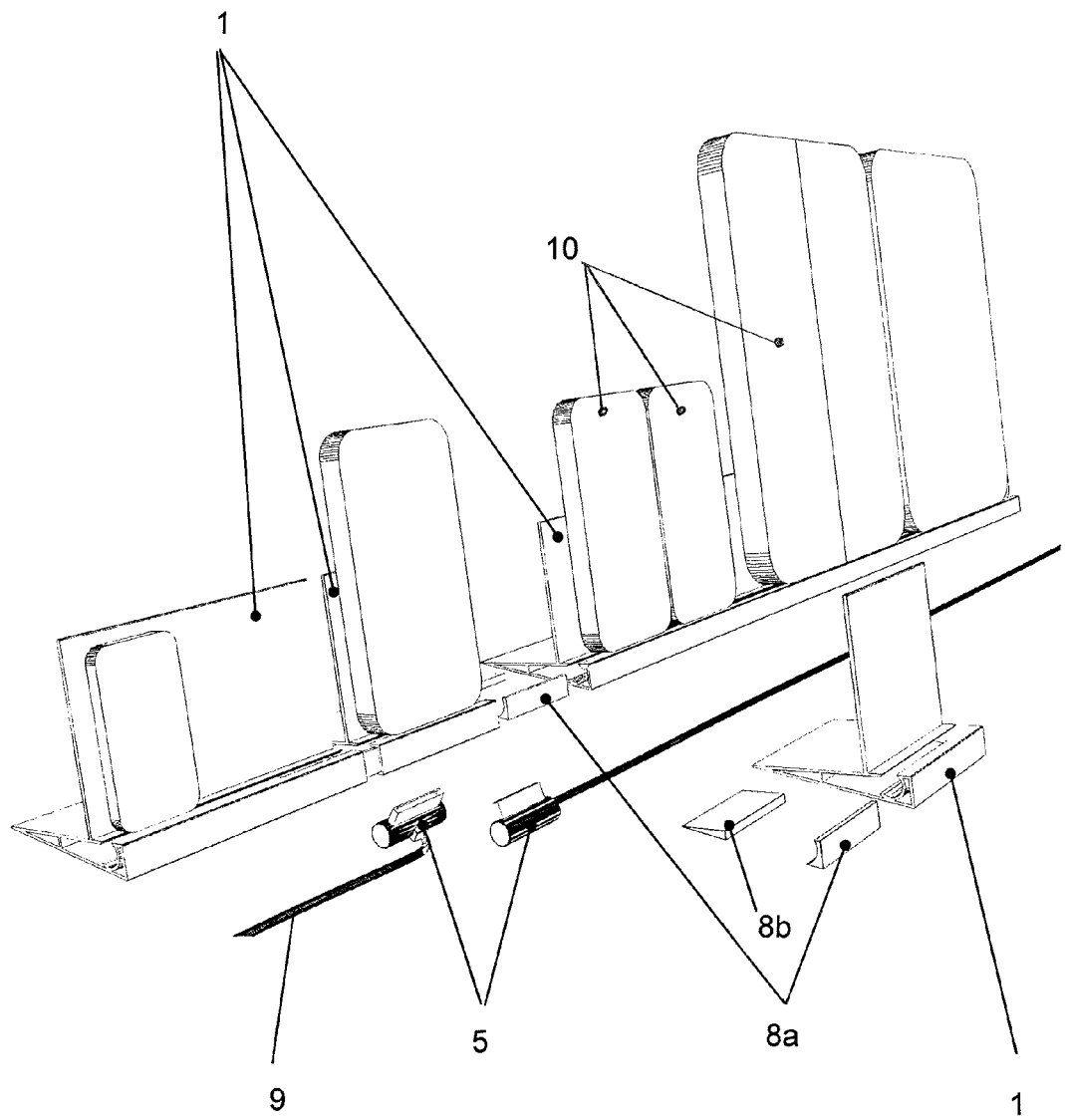
FIG. 3 plural supports of the present invention having different lengths and being partially connected with each other by plug connectors.

FIG. 3 shows a plurality of hollow profiles 1 according to the present invention with a plurality of electronic appliances 10 disposed thereon, in this case iPhones or iPads of the company Apple. As can be seen in the drawing, the plural appliances 10 can readily be positioned next to each other despite their differing sizes because of the slidability of the plug 5 in the longitudinal direction. The slightly inclined position of the display of the appliance with respect to the vertical axis provides a good viewing angle onto the display so that the charging or synchronisation process can be readily followed by the user.

The support of the present invention may for this reason also be well used as a rest for the appliance while a video film or the like is displayed thereon. Moreover, the support of the present invention may be used for presentation of a plurality of appliances at a sales point because the appliances can be positioned next to each other in an optically pleasant way and their displays are all directing in the same direction in which they are well viewable for the customers.

Further shown are two plugs 5 which are fitted into the cylindrical base element 5c of the present invention with the integrally formed protrusion 5b, as well as the corresponding charging cable 9. The Figure shows the 30-pole dock terminal as an example for the electronic connection element 5a. However, depending on the type and generation of the electronic appliance 10 to be connected, any other arbitrary type of plug may be used.

Two shorter hollow profiles 1 shown in the foreground of FIG. 3 are connected with each other by plug connectors 8a, 8b in the longitudinal direction. The longer hollow profile 1 is positioned therebehind in the longitudinal direction so that it may be connected with the middle hollow profile by the corresponding plug connectors 8a, 8b. In the preferred embodiment, the plug connectors 8a, 8b are made of elastic plastics material.

As shown in FIG. 3 farther to the right side, a first plug connector 8a is formed such that it can be inserted to a certain extent in the longitudinal direction into the third channel 7a. The wedge-shaped second plug connector 8b is on the other hand formed such that it may be inserted into the fourth channel 7b. By inserting the protruding end of the first or second plug connectors 8a, 8b into the corresponding third or fourth channel 7a, 7b of a second hollow profile 1, the total length of the support of the present invention can be nearly arbitrarily expanded by modular connection of two or more hollow profiles 1.

LIST OF REFERENCE SIGNS 1 hollow profile
2a lower sidewall
2b upper sidewall
2c short sidewall
2d reinforcing rib
3 supporting rib
4 first channel
4a first slit
4b second slit
4c C-shaped portion
4d holding portion
5 connection plug
5a connection element
5b protrusion
5c base element
6 second channel
7a third channel
7b fourth channel
8a first plug connector
8b wedge-shaped second plug connector
9 charging cable

The invention claimed is:

1. A storage and charging station comprising at least one appliance connection plug, and a support for electronic appliances, the support comprising a hollow profile having a first channel extending in a longitudinal direction of the support and adapted to receive the at least one appliance connection plug, characterized in that the first channel has the basic shape of a cylinder whose inner diameter substantially corresponds to the outer diameter of a cylindrical base element of the connection plug, wherein the connection plug is pivotable about the middle axis of the cylinder, and wherein the first channel provides the connection plug with a linear guidance in the longitudinal direction so that the connection plug is slidable in the longitudinal direction and pivotable within a predetermined angular range in a direction perpendicular to the longitudinal direction.

2. The storage and charging station of claim 1, wherein the first channel has a first slit and a second slit each extending in the longitudinal direction.

3. The storage and charging station of claim 2, wherein the first channel comprises, in a cross-section perpendicular to the longitudinal direction, a substantially C-shaped portion and a holding portion which is located opposite to this C-shaped portion,
and the first slit and the second slit are each positioned between the C-shaped portion and the holding portion.

4. The storage and charging station of claim 2, wherein the connection plug comprises a protrusion extending radially outwards from the base element, wherein the protrusion protrudes into the second slit and confines the pivoting of the connection plug to the predetermined angular range, and
the protrusion and the base element are hollow inside and suitable for conducting an electronic cable.

5. The storage and charging station of claim 2, wherein the connection plug comprises a connection element protruding radially outwards from the base element for electrical connection with the electronic appliance, wherein the connection element protrudes through the first slit.

6. The storage and charging station of claim 1, wherein the hollow profile comprises a supporting rib extending upwards in a direction transversal to the longitudinal direction, wherein an electronic appliance connected to the connection plug can be reclined against the supporting rib in a substantially upright position which is inclined backwards with respect to the vertical axis by about 3° to 25°.

7. The storage and charging station of claim 6, wherein the hollow profile has a basic structure with two sidewalls meeting each other at an acute angle, wherein the two sidewalls substantially form the two long legs of an acute-angled triangle in a cross-section perpendicular to the longitudinal direction.

8. The storage and charging station of claim 1, wherein the hollow profile comprises a second channel extending in the longitudinal direction of the support for guiding an electronic cable connected to the connection plug.

9. The storage and charging station of claim 8, wherein the hollow profile comprises a third channel extending in the longitudinal direction of the support and a fourth channel extending in the longitudinal direction of the support, wherein the third and fourth channels are each adapted to receive appropriately formed plug connectors by which a further hollow profile can be plugged for prolonging the support in the longitudinal direction.

10. The storage and charging station of claim 9, wherein the first channel, the second channel, the third channel and the fourth channel are open in the longitudinal direction at at least one of their end faces.

11. The storage and charging station of claim 1, wherein the hollow profile is made integrally of metal or plastics.

* * * * *